US009503659B2

(12) United States Patent
Ogushi

(10) Patent No.: US 9,503,659 B2
(45) Date of Patent: Nov. 22, 2016

(54) VIDEO DISPLAY DEVICE AND VIDEO DISPLAY METHOD

(75) Inventor: Masahiro Ogushi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 21 days.

(21) Appl. No.: 14/405,683

(22) PCT Filed: Jun. 7, 2012

(86) PCT No.: PCT/JP2012/064649
§ 371 (c)(1),
(2), (4) Date: Dec. 4, 2014

(87) PCT Pub. No.: WO2013/183139
PCT Pub. Date: Dec. 12, 2013

(65) Prior Publication Data
US 2015/0181133 A1    Jun. 25, 2015

(51) Int. Cl.
H04N 5/14       (2006.01)
G09G 5/12       (2006.01)
G06F 3/14       (2006.01)
H04N 5/268      (2006.01)

(52) U.S. Cl.
CPC ............ *H04N 5/268* (2013.01); *G06F 3/1423* (2013.01); *G09G 5/12* (2013.01); *H04N 5/14* (2013.01)

(58) Field of Classification Search
CPC ........ G09G 5/12; G06F 3/1423; H04N 5/14; H04N 5/268
See application file for complete search history.

(56) References Cited

U.S. PATENT DOCUMENTS 5,255,185 A * 10/1993 Mowers .................. A63D 1/00
                                                    340/323 R
5,264,929 A * 11/1993 Yamaguchi ............ H04N 5/268
                                                    348/159
6,215,781 B1 * 4/2001 Kato ...................... H04N 5/268
                                                    348/705

(Continued)

FOREIGN PATENT DOCUMENTS

JP    08-221042 A    8/1996
JP    11-234595 A    8/1999

(Continued)

OTHER PUBLICATIONS

International Search Report (ISR) (PCT Form PCT/ISA/210), in PCT/JP2012/064649, dated Aug. 28, 2012.

*Primary Examiner* — Brian Yenke
*Assistant Examiner* — Sean Haiem
(74) *Attorney, Agent, or Firm* — McGinn IP Law Group, PLLC

(57) ABSTRACT

A video display device includes: a video display unit that displays video in accordance with a video signal; a switching detection signal input and output terminal that receives and outputs from and to another video display device a switching detection signal taking a first or second state; a display control unit that stops video display by the video display unit when a predetermined operation is instructed; a switching process signal output unit that outputs a predetermined switching process signal to change the switching detection signal to the first state when the predetermined operation is instructed, the switching process signal output unit stopping the output of the switching process signal when the predetermined operation is complete; and a switching detection signal input unit that releases the stoppage of the video display by the video display unit when the switching detection signal is in the second state.

16 Claims, 3 Drawing Sheets

(56) References Cited

U.S. PATENT DOCUMENTS

| | | | |
|---|---|---|---|
| 6,246,432 B1 * | 6/2001 | Takami | A61B 1/00045 348/65 |
| 6,493,034 B1 * | 12/2002 | Elberbaum | H04N 5/0733 348/512 |
| 2003/0133046 A1 * | 7/2003 | Wang | H04N 5/7755 348/705 |
| 2011/0164106 A1 * | 7/2011 | Kim | H04N 7/142 348/14.03 |

FOREIGN PATENT DOCUMENTS

| | | |
|---|---|---|
| JP | 2000-330502 A | 11/2000 |
| JP | 2004-349770 A | 12/2004 |
| JP | 2009-290685 A | 12/2009 |

* cited by examiner

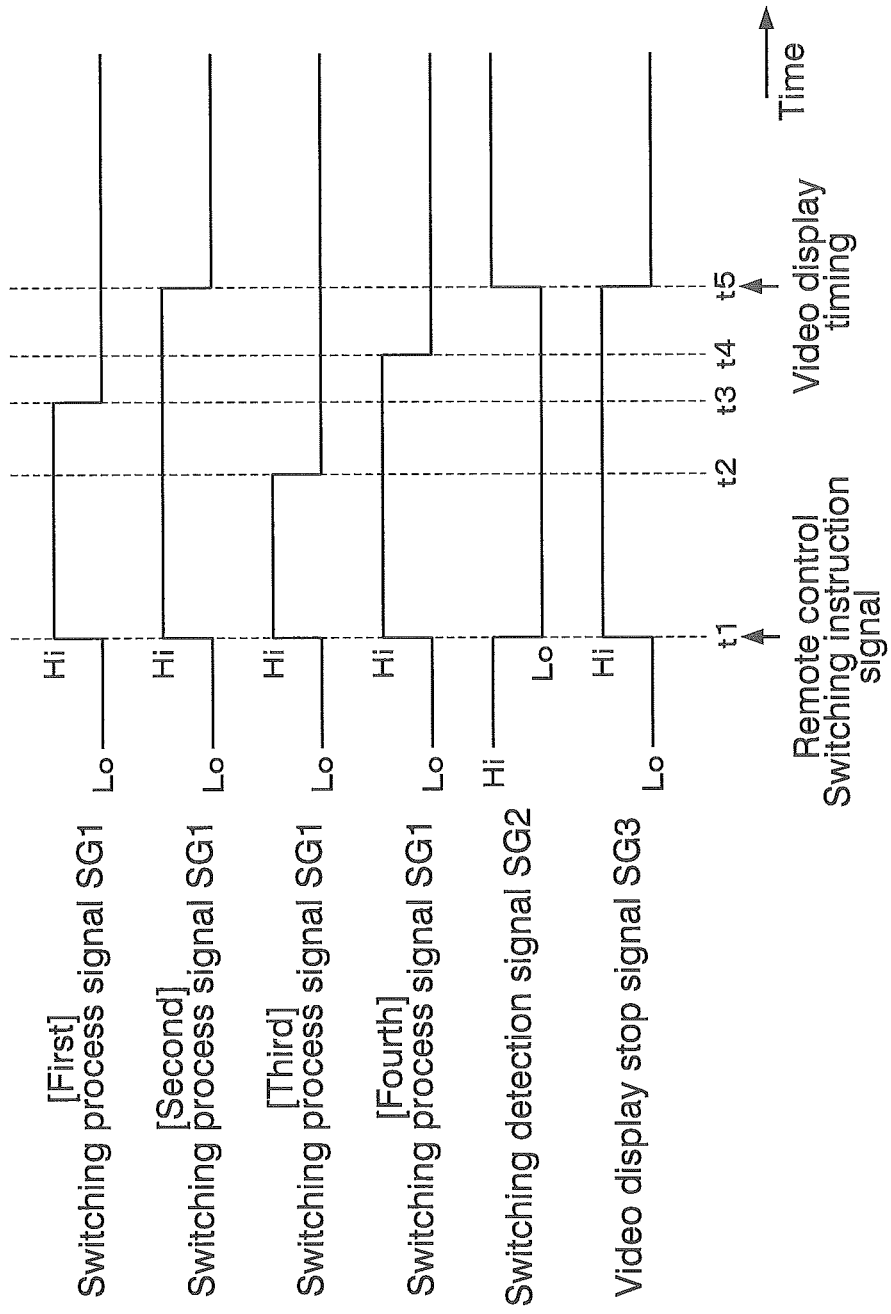

VIDEO DISPLAY DEVICE AND VIDEO DISPLAY METHOD

TECHNICAL FIELD

The present invention relates to a video display device and a video display method.

BACKGROUND ART

When a plurality of video display devices are used simultaneously, if a reaction time of each video display device varies in a specific operation such as switching of input or display start, desired visual quality may not be obtained. An example of a video display device that solves this problem is described in Patent Document 1.

In a video display system described in Patent Document 1, a plurality of video display devices respectively include a timer that generates an interrupt signal at a constant cycle. The respective video display devices perform specific processing in synchronization with the interrupt signal generated by the respective timers. Each of the video display devices further includes a receiving device for a remote control transmission device (hereinafter, referred to as remote control). When each of the receiving devices receives a predetermined system synchronization signal transmitted from the remote control, the respective video display devices initialize the respective timers. The system synchronization signal is transmitted from the remote control, when a user operates a predetermined reset operation means provided in the remote control. In the video display system described in Patent Document 1, interrupt signal generation times of the respective timers are synchronized with each other by transmitting the system synchronization signal from the remote control.

PRIOR ART DOCUMENTS

Patent Document

[Patent Document 1] Japanese Unexamined Patent Application, First Publication No. H11-234595

SUMMARY OF THE INVENTION

Problem to be Solved by the Invention

In the system described in Patent Document 1, a user operates a remote control and the remote control transmits a system synchronization signal, to thereby synchronize operations of the respective video display devices. Consequently, all of the plurality of video display devices need to receive the system synchronization signal simultaneously. However, it may be difficult to receive the system synchronization signal by the plurality of video display devices simultaneously, due to an arrangement of the plurality of video display devices or an operation position of the remote control. In such a case, there is a problem in that it is not possible to reliably synchronize the switching operation of the respective video display devices.

The present invention has been conceived in view of the above situations, and an exemplary object thereof is to provide a video display device and a video display method that can reliably synchronize switching operations of the respective video display devices.

Means for Solving the Problem

In order to solve the above problem, a video display device of the present invention includes: a video display unit that displays video in accordance with a video signal; a switching detection signal input and output terminal that receives and outputs from and to another video display device a switching detection signal taking a first or second state, the switching detection signal being in the second state in a case where it is in a normal state, the switching detection signal indicating that the video display unit is performing a switching process of the displayed video in a case where it is in the second state; a display control unit that stops video display by the video display unit when a predetermined operation is instructed; a switching process signal output unit that outputs a predetermined switching process signal to change the switching detection signal to the first state when the predetermined operation is instructed, the switching process signal output unit stopping the output of the switching process signal when the predetermined operation is complete; and a switching detection signal input unit that releases the stoppage of the video display by the video display unit when the switching detection signal is in the second state.

A video display method is performed by a video display device including a video display unit and a switching detection signal input and output terminal, the video display unit displaying video in accordance with a video signal, the switching detection signal input and output terminal receiving and outputting from and to another video display device a switching detection signal taking a first or second state, the switching detection signal being in the second state in a case where it is in a normal state, the switching detection signal indicating that the video display unit is performing a switching process of the displayed video in a case where it is in the second state, and the video display method includes: a display control step of stopping video display by the video display unit when a predetermined operation is instructed; a switching process signal output step of outputting a predetermined switching process signal to change the switching detection signal to the first state when the predetermined operation is instructed, and stopping the output of the switching process signal when the predetermined operation is complete; and a switching detection signal input step of releasing the stoppage of the video display by the video display unit when the switching detection signal is in the second state.

Effect of the Invention

According to the present invention, the switching detection signal taking the first or second state, which is in the second state in a normal state, and in the first state, indicates that a switching process of displayed video is being performed, can be shared with other video display devices. Therefore, the respective video display devices can detect that another video display device is performing the switching process of the displayed video. Accordingly, the respective video display devices can release stoppage of video display synchronously with other video display devices by releasing stoppage of video display based on the switching detection signal. As a result, the switching operations in the plurality of video display devices can be synchronized more reliably, as compared with a case in which synchronization is achieved by using, for example, a predetermined signal transmitted from a remote control.

BRIEF DESCRIPTION OF THE DRAWINGS

FIG. 3 is a timing chart showing a change of a signal waveform in the video display device shown in FIG. 1.

EMBODIMENTS FOR CARRYING OUT THE INVENTION

Figure 1:
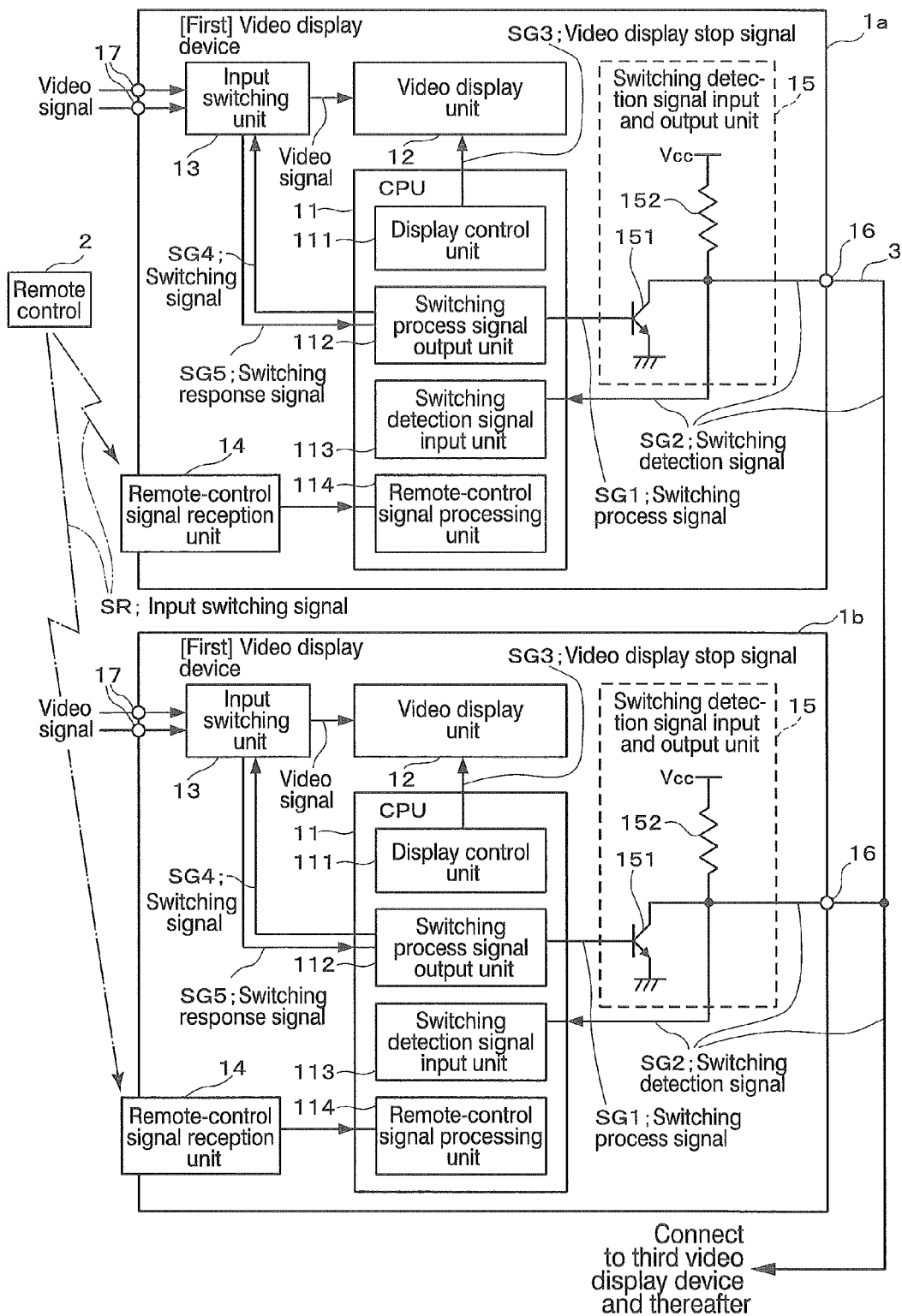
FIG. 1 is a block diagram showing a configuration example of a video display device as an exemplary embodiment of the present invention.

Hereunder, exemplary embodiments of the present invention will be described with reference to the drawings. FIG. 1 is a block diagram showing a configuration example of an exemplary embodiment of a video display device according to the present invention. A video display device 1a shown in FIG. 1 is connected to a plurality of video display devices such as a video display device 1b having the same configuration via a signal line 3. Moreover the respective video display devices such as the video display device 1a and the video display devices 1b perform a switching operation of a video signal when a user operates a remote control 2 to transmit an input switching signal SR instructing a switching operation of the video signal from the remote control 2.

The video display device 1a is configured as, for example, a display device. The video display device 1a performs a predetermined switching process in response to the input switching signal SR transmitted from the remote control 2, and selectively switches and displays any of a plurality of input video signals. The video display device 1a includes a CPU (central processing unit) 11, a video display unit 12, an input switching unit 13, a remote-control signal reception unit 14, a switching detection signal input and output unit 15, a switching detection signal input and output terminal 16, and a plurality of video signal input terminals 17.

The CPU 11 is a semiconductor information processor also referred to as a microcomputer or the like, and in addition to an arithmetic device includes a peripheral device therein such as volatile and non-volatile memories, a general-purpose input and output circuit, and an input and output circuit of a serial signal. The CPU 11 performs predetermined processing by using internal hardware by executing a program stored in the internal non-volatile memory. In FIG. 1, a set of the hardware and the program for performing the respective processing by the CPU 11 is divided into respective functions, and indicated as a display control unit 111, a switching process signal output unit 112, a switching detection signal input unit 113, and a remote-control signal processing unit 114.

When a switching process of a video signal is instructed by the remote control 2, the display control unit 111 stops video display by the video display unit 12 (that is, video display is muted) in response to an instruction from the remote-control signal processing unit 114. When the display control unit 111 outputs a video display stop signal SG3 (that is, when the video display stop signal SG3 is set to a predetermined level and activated), the video display unit 12 stops video display by changing all video outputs to, for example, black signals. Moreover, the display control unit 111 deactivates the video display stop signal SG3 in response to an instruction from the switching detection signal input unit 113. When the video display stop signal SG3 is deactivated, the video display unit 12 releases suspension of video display, and displays a video image based on the input video signal. In the present exemplary embodiment, when the video display stop signal SG3 is at a Hi (High) level, mute of video display is instructed.

When a switching process of the video signal is instructed by the remote control 2, the switching process signal output unit 112 outputs a switching process signal SG1 at a Hi level in response to the instruction from the remote-control signal processing unit 114. When the switching process signal SG1 becomes the Hi level, the switching detection signal input and output unit 15 sets a switching detection signal SG2 to a Lo (Low) level. Further when the switching process of the video signal is complete, the switching process signal output unit 112 stops the output of the switching process signal SG1 (that is, the switching process signal SG1 is set to the Lo level). Here the switching process signal SG1 is a signal that indicates that the display video image by the video display unit 12 in the own device is being in a switching process, in the case where the switching process signal SG1 is at the Hi level. The switching process signal SG1 is output from the CPU 11 and input to the switching detection signal input and output unit 15.

Furthermore the switching detection signal SG2 is a signal taking a Lo or Hi level state, which is at the Hi level in the normal state, and at the Lo level, indicates that a switching process of a display video image is currently being performed. Because the switching detection signal SG2 is shared by the respective video display devices, when the level of the switching detection signal SG2 is Lo, it indicates that the display video image is being in a switching process by at least one of the video display units 12 provided in the plurality of video display devices 1a, 1b, and the like. The switching detection signal SG2 is input and output to and from other video display devices such as the video display device 1b via the switching detection signal input and output terminal 16 and the signal line 3, and is shared with the other video display devices. The level of the switching detection signal SG2 changes in response to the operation of the switching detection signal input and output unit 15 in the video display devices 1a, 1b, and the like. The switching detection signal input and output terminal 16 is a terminal which is detachably connected with the signal line 3.

Further, when a switching process of the video signal is instructed by the remote control 2, the switching process signal output unit 112, in response to the instruction from the remote-control signal processing unit 114, outputs the switching process signal SG1 at the Hi level and then outputs a switching signal SG4 to the input switching unit 13. The switching signal SG4 specifies a video signal selected by the input switching unit 13. Also, a switching response signal SG5 that is output from the input switching unit 13 is input to the switching process signal output unit 112. The switching response signal SG5 is a signal that is output from the input switching unit 13 when it finishes the switching operation of the video signal in response to the switching signal SG4. When the input switching unit 13 outputs the switching response signal SG5, the switching process signal output unit 112 determines that a switching process of the video signal is complete, and stops the output of the switching process signal SG1.

The switching detection signal input unit 113 receives the switching detection signal SG2, and when the switching detection signal SG2 is at the Hi level (that is, when the level thereof is different from the Lo level), it outputs a predetermined instruction to the display control unit 111, thereby releasing suspension of video display (that is, mute of video display) by the video display unit 12.

The remote-control signal processing unit 114 performs predetermined processing based on the signal input from the remote-control signal reception unit 14. For example, when the input switching signal SR is transmitted from the remote control 2, the remote-control signal reception unit 14 outputs a signal in response to the input switching signal SR, and the remote-control signal processing unit 114 to which it is input outputs a predetermined instruction to the display control unit 111 and the switching process signal output unit 112.

The video display unit 12 displays a video image based on the video signal input from the input switching unit 13. When the video display device 1a is configured as, for example, a panel display device, the video display unit 12 constitutes a display panel. The video display unit 12 suspends video display by changing all video outputs to, for example, black signals regardless of the video signal input from the input switching unit 13, while the display control unit 111 is outputting the video display stop signal SG3.

The input switching unit 13 receives a plurality of video signals from the plurality of video signal input terminals 17, and selectively switches the video signal to be output to the video display unit 12 based on the switching signal SG4 output from the switching process signal output unit 112. When the switching operation of the video signal to be output is complete, the input switching unit 13 outputs the switching response signal SG5 indicating that effect. When the input switching unit 13 (or the video display unit 12) includes a buffer memory that temporarily accumulates video signals, then after the video signal after switching is accumulated in the buffer memory, and when it becomes displayable, the switching response signal SG5 is output.

The remote-control signal reception unit 14 receives a radio signal such as the input switching signal SR transmitted from the remote control 2, and outputs a signal indicating the content of the radio signal to the remote-control signal processing unit 114.

The switching detection signal input and output unit 15 is a circuit that receives the switching process signal SG1 output from the switching process signal output unit 112, and outputs the switching detection signal SG2 to the switching detection signal input unit 113. The state of the switching detection signal SG2 (that is, a potential level) is determined depending on the state of the switching process signal SG1 and the state of the signal line 3 connected to the switching detection signal input and output terminal 16 (a potential level or a size of flowing current). In the configuration shown in FIG. 1, the switching detection signal input and output unit 15 is configured by including a transistor 151 and a resistor 152. The switching process signal SG1 is input to a base of the transistor 151, its collector is connected to the switching detection signal input and output terminal 16, and its emitter is earthed to the ground. The collector of the transistor 151 and the switching detection signal input and output terminal 16 are connected to one end of the resistor 152, and the other end of the resistor 152 is connected to a power source Vcc.

In the switching detection signal input and output unit 15, when the switching process signal SG1 becomes the Hi level, the transistor 151 is turned on, and the switching detection signal SG2 becomes the Lo level. On the other hand, when the switching process signal SG1 becomes the Lo level, the transistor 151 is turned off. Therefore the level of the switching detection signal SG2 is determined depending on the operation of switching detection signal input and output units 15 of other video display devices such as the video display device 1b connected to the switching detection signal input and output terminal 16. That is, a so-called wired-OR (or a configuration similar thereto) is formed by the plurality of switching detection signal input and output units 15.

For example, as shown in FIG. 1, when the video display device 1a and the video display device 1b are connected to each other via the signal line 3, then even if the switching process signal SG1 in the video display device 1a is at the Lo level, if the switching process signal SG1 in the video display device 1b is at the Hi level, the switching detection signal SG2 becomes the Lo level. On the other hand, when the switching process signals SG1 become the Lo level in all of the video display devices such as the video display devices 1a, 1b, and the like connected to each other via the signal line 3, the switching detection signal SG2 becomes the Hi level.

In the present exemplary embodiment, the configurations of the plurality of video display devices connected to each other via the signal line 3 in FIG. 1 may be the same or may be different from each other. That is to say, if the switching detection signal input and output unit 15 having the same configuration (or a similar configuration) is provided, then for example, the video display devices in which the configurations of the video display units 12 are different from each other can be connected to each other via the signal line 3. Moreover, the configuration of the switching detection signal input and output unit 15 can be such that, instead of the configuration shown in FIG. 1, for example, a resistor is connected to between the switching detection signal input and output terminal 16 and the ground, and the emitter and the collector of the transistor are connected between the power source Vcc and the switching detection signal input and output terminal 16. Furthermore, the transistor to be connected to the switching detection signal input and output terminal 16 is not limited to a bipolar transistor and may be a unipolar transistor. In this case, a drain is connected to the switching detection signal input and output terminal 16.

Figure 2:
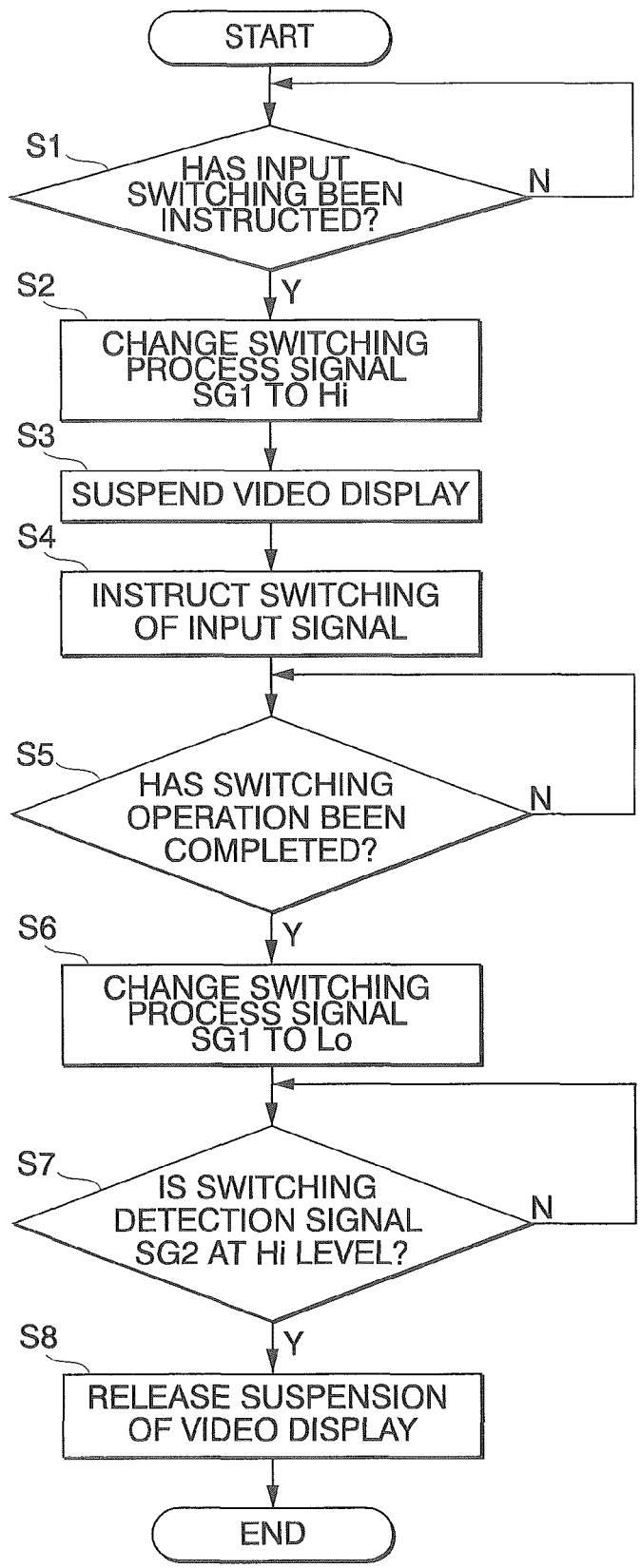
FIG. 2 is a flowchart showing a processing flow in the video display device shown in FIG. 1.

Next is a description of an operation example of the video display device 1a shown in FIG. 1, with reference to FIG. 2. The flowchart shown in FIG. 2 indicates a processing flow by the CPU 11 at the time of switching the video signal by the input switching unit 13 when the input switching signal SR is transmitted from the remote control 2 shown in FIG. 1. Here, the CPU 11 can execute processing other than that shown in FIG. 2, in parallel with other processing by time sharing or the like.

After the video display device 1a is activated, the CPU 11 waits until the input switching signal SR is transmitted from the remote control 2 (repeat N (=NO) in step S1). When the user operates a predetermined switch of the remote control 2 to transmit the input switching signal SR from the remote control 2, the remote-control signal reception unit 14 receives the input switching signal SR and outputs a signal indicating that effect to the remote-control signal processing unit 114. When the remote-control signal processing unit 114 detects that the input switching signal SR has been received by the remote-control signal reception unit 14, a determination result by the remote-control signal processing unit 114 in step S1 becomes Y (=YES), and the remote-control signal processing unit 114 sends a predetermined instruction to the switching process signal output unit 112 and the display control unit 111. That is, the switching process signal output unit 112 changes the level of the switching process signal SG1 to the Hi level in response to the instruction from the remote-control signal processing unit 114 (step S2). Here the transistor 151 is turned on and the switching detection signal SG2 becomes the Lo level.

Moreover, the display control unit 111 activates the video display stop signal SG3 to suspend video display by the video display unit 12 (step S3). Then the switching process signal output unit 112 outputs the predetermined switching signal SG4 to instruct the input switching unit 13 to switch the input signal (step S4).

Subsequently, the switching process signal output unit 112 waits until the switching response signal SG5 is sent from the input switching unit 13 (repeat N in step S5). When the switching process is complete in the input switching unit 13 and the input switching unit 13 outputs the switching response signal SG5, the switching process signal output unit 112 determines that the switching operation is complete (Y in step S5), and changes the level of the switching process signal SG1 to the Lo level (step S6). Here the transistor 151 is turned off.

Subsequently, the switching detection signal input unit 113 waits until the switching detection signal SG2 becomes the Hi level (repeat N in step S7). When the switching process is complete in the input switching unit 13 in the respective video display devices such as the video display device 1*b*, all of the switching process signals SG1 become the Lo level, and the respective transistors 151 are turned off. Here the switching detection signal SG2 becomes the Hi level.

When all of the transistors 151 are turned off and the switching detection signal SG2 becomes the Hi level, the switching detection signal input unit 113 determines that the switching detection signal SG2 is at the Hi level (Y in step S7). Here, the switching detection signal input unit 113 outputs a predetermined instruction to the display control unit 111, and the display control unit 111 deactivates the video display stop signal SG3. Here, the video display unit 12 releases suspension of video display (step S8). That is to say, the video display unit 12 releases suspension of video display to display a video image based on the input video signal. Thereafter, the determination process in step S1 is executed repeatedly.

Next is a description with reference to FIG. 3, of an operation example in which four video display devices same as the video display device 1*a* shown in FIG. 1 are connected to each other via the signal line 3. FIG. 3 shows a time change of the switching process signal SG1 in the respective video display devices (shown as [first] to [fourth]), the switching detection signal SG2 on the signal line 3, and the video display stop signals SG3 (it is assumed they similarly change in the four video display devices). When it is assumed that the switching instruction signal SR is transmitted from the remote control 2 at a time t1, the respective switching process signals SG1 become the Hi level in response thereto and the switching detection signal SG2 becomes the Lo level. Moreover the video display stop signals SG3 become the Hi level in the [first] to [fourth] video display devices. Thereafter, switching process of the video signal is started by the input switching unit 13 in the [first] to [fourth] video display devices.

Subsequently, the switching process is complete in the [first] to [fourth] video display devices at any time of times t2 to t5. At the time t2, the switching process is complete in the [third] video display device, and the switching process signal SG1 becomes the Lo level. At this point in time, the switching detection signal SG2 is still at the Lo level. At the time t3, the switching process is complete in the [first] video display device, and the switching process signal SG1 becomes the Lo level. At this point in time, the switching detection signal SG2 is still at the Lo level. At the time t4, the switching process is complete in the [fourth] video display device, and the switching process signal SG1 becomes the Lo level. At this point in time, the switching detection signal SG2 is still at the Lo level. Then at the time t5, the switching process is complete in the [second] video display device, and the switching process signal SG1 becomes the Lo level. At this point in time, all of the switching process signals SG1 become the Lo level, and the switching detection signal SG2 becomes the Hi level. Here, the video display stop signals SG3 become the Lo level in the [first] to [fourth] video display devices, and release of mute of video display is instructed.

In the example shown in FIG. 3, the switching process is performed by the respective four video display devices in synchronization with mute of video display. Meanwhile, the times at which the switching process completes vary. Consequently, the switching detection signal SG2 input to the respective switching detection signal input units 113 becomes the Hi level at the time t5 at which the switching process signal SG1 becomes the Lo level in the second video display device having the longest switching process time. Then mute of video display is released (that is, the video display stop signal SG3 is changed from Hi to Lo) in synchronization with a time at which the switching detection signal SG2 being an input signal of the respective switching detection signal input units 113 is changed from Lo to Hi. In this manner, the start and release of mute of video display are synchronized between the respective devices, thereby enabling to synchronize the video display states at the time of switching the input of the four video display devices. As a result, even if the plurality of video display devices are connected to each other, video display can be synchronized, and the visual quality of the video image can be improved as compared to a case in which synchronization of video display is not achieved.

In the exemplary embodiment described above, the operation instructed from the remote control 2 is the switching operation of the video input signal. However, it can also be an activation operation at the time of turning on the power source of the video display device. In this case, the switching instruction signal generated at the time t3 in FIG. 3 is read as an activation signal (a signal instructing to turn on the power source of the video display device), and both the switching process signal SG1 and the video display stop signal SG3 are set to the Hi level at the time of receiving the activation signal at the time t3. When the video display based on the video signal input by the respective video display units 12 becomes possible, the switching process signal SG1 is changed to the Lo level (times t2 to t5). Then when all of the switching process signals SG1 become the Lo level and the switching detection signal SG2 becomes the Hi level (time t5), the respective video display stop signals SG3 are changed to the Lo level. Here mute of video display is released, and video display based on the input video signal is started.

According to the exemplary embodiment described above, at the time of the specific operation (switching of input or turning on of the power source by the remote control) that performs a switching process relating to the video display state determined beforehand, video display is muted from a point in time when the specific operation is requested. Then mute of video display is released in synchronization with the change of the switching process signal SG1 from Hi to Lo of the slowest video display device, thereby enabling to synchronize a switching display time with other video display devices. Here, at the time of releasing video mute, the operation of video mute (non-display of video image display) is released by confirming the state of the switching detection signal input and output unit 15 (that is, the state of the switching detection signal SG2).

A program for realizing the respective functions by the CPU 11 in FIG. 1 may be recorded in a computer readable recording medium, and the program recorded in the recording medium may be read and executed by a computer system to control video display. The "computer system" referred to herein includes an OS and hardware such peripheral devices.

Moreover, when a WWW system is used, the "computer system" includes a website providing environment (or display environment).

Furthermore, the "computer readable recording medium" is a portable medium such as a flexible disk, a magneto-optical disk, a ROM, and a CD-ROM, and a storage device such as a hard disk incorporated in the computer system. Further, the "computer readable recording medium" includes one that temporarily holds a program for a certain time, such as a volatile memory in the computer system that serves as a server or a client. Furthermore the program may be a program that realizes a part of the functions described above, or a program that can realize the above-described functions by a combination with a program already recorded in the computer system. Alternatively, the program may be stored in a predetermined server, and may be distributed (downloaded or the like) via a communication line in response to a request from another device.

The exemplary embodiments of the present invention have been described above in detail with reference to the drawings. However, the specific configuration is not limited to the exemplary embodiments, and designs and the like that do not depart from the scope of the present invention are included.

Aspects of the present invention are as described below.
(Supplementary Note 1)
There is provided:
a video display unit that displays video in accordance with a video signal;
a switching detection signal input and output terminal that receives and outputs from and to another video display device a switching detection signal taking a first or second state, the switching detection signal being in the second state in a case where it is in a normal state, the switching detection signal indicating that the video display unit is performing a switching process of the displayed video in a case where it is in the second state;
a display control unit that stops video display by the video display unit when a predetermined operation is instructed;
a switching process signal output unit that outputs a predetermined switching process signal to change the switching detection signal to the first state when the predetermined operation is instructed, the switching process signal output unit stopping the output of the switching process signal when the predetermined operation is complete; and
a switching detection signal input unit that releases the stoppage of the video display by the video display unit when the switching detection signal is in the second state.
(Supplementary Note 2)
The predetermined operation is instructed by a radio signal, and there is further provided a reception unit that receives the radio signal instructing the predetermined operation.
(Supplementary Note 3)
The predetermined operation is a switching operation of the video signal.
(Supplementary Note 4)
The predetermined operation is an activation operation of the own device.
(Supplementary Note 5)
A video display method is performed by a video display device including a video display unit and a switching detection signal input and output terminal, the video display unit displaying video in accordance with a video signal, the switching detection signal input and output terminal receiving and outputting from and to another video display device a switching detection signal taking a first or second state, the switching detection signal being in the second state in a case where it is in a normal state, the switching detection signal indicating that the video display unit is performing a switching process of the displayed video in a case where it is in the second state, and the video display method includes:
a display control step of stopping video display by the video display unit when a predetermined operation is instructed;
a switching process signal output step of outputting a predetermined switching process signal to change the switching detection signal to the first state when the predetermined operation is instructed, and stopping the output of the switching process signal when the predetermined operation is complete; and
a switching detection signal input step of releasing the stoppage of the video display by the video display unit when the switching detection signal is in the second state.

REFERENCE SYMBOLS 1a, 1b Video display device
11 CPU
111 Display control unit
112 Switching process signal output unit
113 Switching detection signal input unit
114 Remote-control signal processing unit
12 Video display unit
13 Input switching unit
14 Remote-control signal reception unit
15 Switching detection signal input and output unit
16 Switching detection signal input and output terminal
17 A plurality of video signal input terminals

The invention claimed is:
1. A video display device, comprising:
a video display unit that displays video in accordance with a video signal;
a display control unit that stops video display by the video display unit when a predetermined operation is instructed;
a switching process signal output unit that outputs a predetermined switching process signal when the predetermined operation is instructed, the switching process signal output unit stopping the output of the switching process signal when the predetermined operation is complete;
a switching detection signal input and output unit that outputs a switching detection signal, the switching detection signal taking a first state in a case where the switching process signal is being output by the switching process signal output unit of the display device, the switching detection signal taking the first state in a case where the switching process signal is being output by a switching process signal output unit of an other display device, the switching detection signal taking a second state in a case where the switching process signal is not being output by either the switching process signal output unit of the display device or the switching process signal output unit of the other display device; and
a switching detection signal input unit that releases the stoppage of the video display by the video display unit when the switching detection signal is in the second state,
wherein the first state includes that at least one of the video display unit of the video display device and a video display unit of the other video display device is switching a display video image; and wherein the second state indicates that the video display unit of the video display device has completed switching of a display video image and a video display unit of the other video display device has completed switching of the display video image.

2. The video display device according to claim 1, wherein the predetermined operation is instructed by a radio signal, and wherein the video display device further comprises a reception unit that receives the radio signal instructing the predetermined operation.

3. The video display device according to claim 1, wherein the predetermined operation comprises a switching operation of the video signal.

4. The video display device according to claim 1, wherein the predetermined operation comprises an activation operation of an own device.

5. A video display method performed by a video display device including a video display unit, the video display method comprising:

displaying, by the video display unit, video in accordance with a video signal;

stopping video display by the video display unit when a predetermined operation is instructed;

outputting a predetermined switching process signal when the predetermined operation is instructed;

stopping the output of the switching process signal when the predetermined operation is complete;

outputting a switching detection signal, the switching detection signal taking a first state in a case where the switching process signal is being output by the display device, the switching detection signal taking the first state in a case where the switching process signal is being output by an other display device, the switching detection signal taking a second state in a case where the switching process signal is not being output by either the display device or the other display device; and releasing a stoppage of the video display by the video display unit when the switching detection signal is in the second state, wherein the first state indicates that at least one of the video display unit of the video display device and a video display unit of the other video display device is switching a display video image; and wherein the second state indicates that the video display unit of the video display device has completed switching of a display video image and a video display unit of the other video display device has completed switching of the display video image.

6. The video display device according to claim 1, wherein the switching process signal outputted by the switching process signal output unit of the video display device indicates whether the video display unit of the video display device is switching a display video image.

7. The video display device according to claim 1, wherein the switching detection signal input and output unit comprises a transistor and a resistor, and wherein the predetermined switching process signal, outputted from the switching process signal output unit, is input to a base of the transistor.

8. The video display device according to claim 7, wherein a collector of the transistor is connected to a switching detection signal input and output terminal that is coupled to an output of a transistor of the other display device that is coupled to the switching process signal output unit of the other display device.

9. The video display device according to claim 8, wherein the collector of the transistor and the switching detection signal input and output terminal are connected to one end of the resistor.

10. The video display device according to claim 9, wherein an other end of the resistor is connected to a power source, and an emitter of the transistor is connected to ground.

11. The video display method according to claim 5, wherein the switching process signal outputted by the video display device indicates whether the video display device is switching a display video image.

12. The video display method according to claim 5, wherein the video display unit further includes a switching detection signal input and output unit that outputs the switching detection signal, and wherein the switching detection signal input and output unit comprises a transistor and a resistor.

13. The video display method according to claim 12, wherein the video display unit further includes a switching process signal output unit, and wherein the predetermined switching process signal, outputted from the switching process signal output unit, is input to a base of the transistor.

14. The video display method according to claim 13, wherein a collector of the transistor is connected to a switching detection signal input and output terminal that is coupled to an output of a transistor of the other display device that is coupled to a switching process signal output unit of the other display device.

15. The video display method according to claim 14, wherein the collector of the transistor and the switching detection signal input and output terminal are connected to one end of the resistor.

16. The video display method according to claim 15, wherein an other end of the resistor is connected to a power source, and an emitter of the transistor is connected to ground.

* * * * *